United States Patent
Maeda

(10) Patent No.: US 11,146,710 B2
(45) Date of Patent: Oct. 12, 2021

(54) PRINTING APPARATUS AND CONTROL METHOD

(71) Applicant: CANON KABUSHIKI KAISHA, Tokyo (JP)

(72) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/900,221

(22) Filed: Jun. 12, 2020

(65) Prior Publication Data
US 2020/0412912 A1 Dec. 31, 2020

(30) Foreign Application Priority Data
Jun. 28, 2019 (JP) .............................. JP2019-121427

(51) Int. Cl.
*H04N 1/60* (2006.01)

(52) U.S. Cl.
CPC ........... *H04N 1/6002* (2013.01); *H04N 1/603* (2013.01)

(58) Field of Classification Search
CPC .............................. H04N 1/6002; H04N 1/603
See application file for complete search history.

(56) References Cited

U.S. PATENT DOCUMENTS

| | | | |
|---|---|---|---|
| 5,801,855 A | 9/1998 | Ohta | 358/518 |
| 6,608,927 B2 | 8/2003 | Ohta | 382/167 |
| 2001/0035966 A1 | 11/2001 | Ohta | 358/1.9 |
| 2018/0367704 A1* | 12/2018 | Iwafuchi | H04N 1/6008 |

FOREIGN PATENT DOCUMENTS

JP H07-274025 10/1995

* cited by examiner

*Primary Examiner* — Christopher Wait
(74) *Attorney, Agent, or Firm* — Venable LLP

(57) ABSTRACT

To make it possible to specify a color space of image data even in a case where color space identification information is not attached to the image data. The image processing system that handles image data whose color spaces are different comprises a learning unit configured to perform machine learning by taking image data and metadata thereof as input data and color space identification information as supervised data. In the machine learning, a learning model is optimized so that a deviation between the color space predicted from the input data and the color space specified by the color space identification information becomes a minimum.

14 Claims, 14 Drawing Sheets

AT THE TIME OF LEARNING

AT THE TIME OF INFERENCE

PRINTING APPARATUS AND CONTROL METHOD

BACKGROUND OF THE INVENTION

Field of the Invention

The present disclosure relates to an image processing system that handles image data in a variety of color spaces.

Description of the Related Art

A method is proposed conventionally (Japanese Patent Laid-Open No. 7-274025), which uses a standard color space in order to efficiently absorb a difference in color reproducibility among devices at the time of outputting an image captured by an image capturing apparatus, such as a digital camera, by an image output device, such as a printer and a display. In recent years, in addition to conventional sRGB and AdobeRGB, a variety of standard color spaces, such as DiplayP3, appear and are used for transmission and reception of image files among devices.

For example, in a situation in which an image captured by a smartphone or a digital camera is printed by a printer, there are a case where information (color space identification information) for identifying a standard color space used in the image data to be input to the printer is attached and a case where the information is not attached. On the printer side, in a case where the color space identification information is attached to the image data, it is possible to appropriately convert the color space into the color space (device-dependent color space) used in the printer itself in accordance with the standard color space specified thereby. However, in a case where the color space identification information is not attached, there is no way other than to perform conversion by determining the color space to be the predetermined standard color space determined in advance, and therefore, there is a case where it is not possible to perform appropriate color space conversion processing as a result.

SUMMARY OF THE INVENTION

The printing apparatus according to the present disclosure is a printing apparatus comprising: at least one memory that stores a program; and at least one processor that executes the program to perform: receiving an image file including image data to be printed; requesting for, in a case where it is not possible to specify a color space of the image data from the image file, inference of the color space of the image data by using a learning model; determining the color space of the image data based on inference results corresponding to the request; and performing printing processing of the image dada based on the determined color space, and in the inference, at least one of image information obtained by analyzing the image data included in the image file and image capturing information relating to image capturing processing for obtaining the image data is input to the learning model and information indicating the color space of the image data is output from the learning model as the inference results.

Further features of the present invention will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment (Entire Configuration of Image Processing System)

Figure 1:
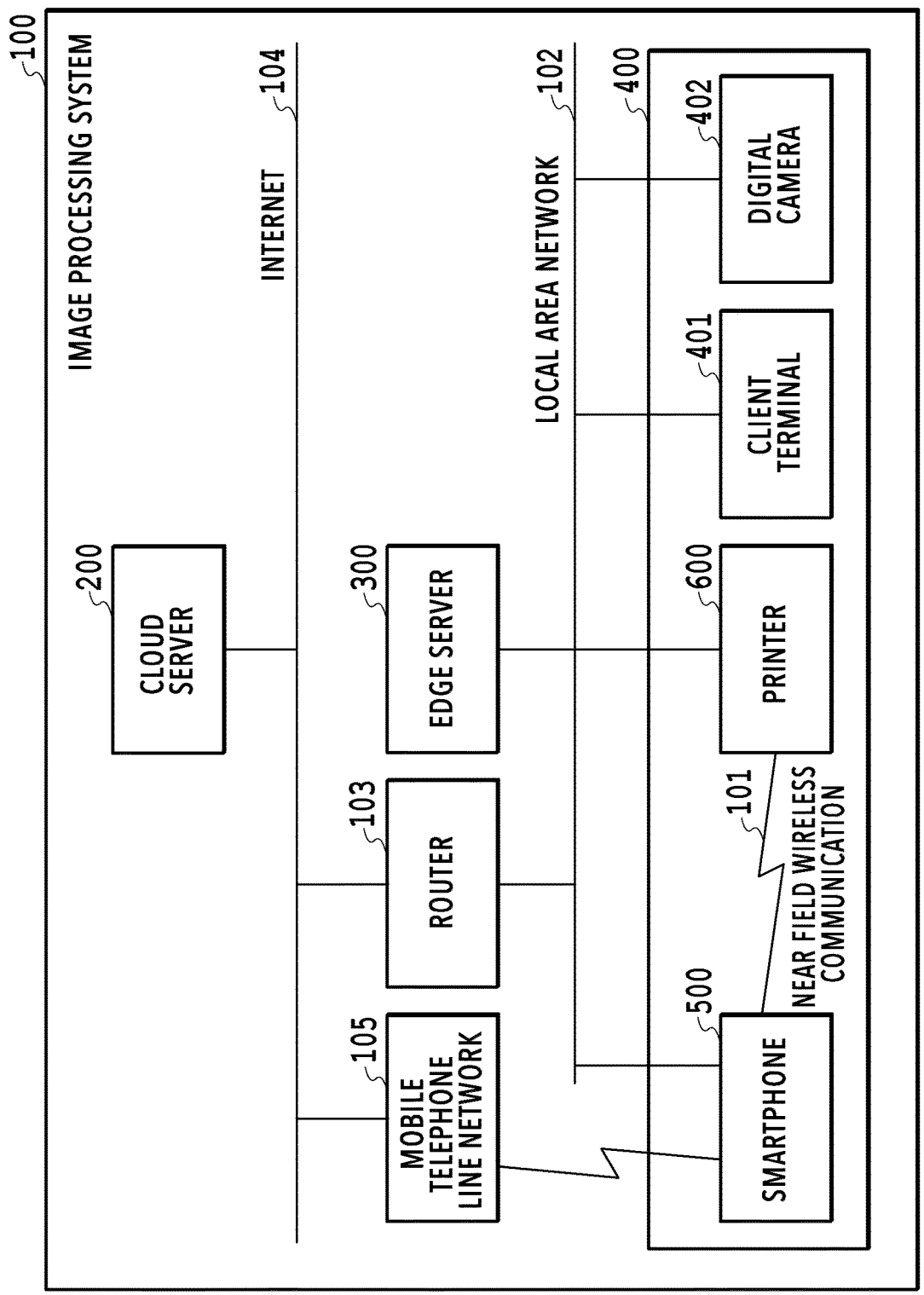
FIG. 1 is a diagram showing an example of a configuration of an image processing system.

FIG. 1 is a diagram showing an example of the configuration of an image processing system 100 according to the present embodiment. The image processing system 100 includes a cloud server 200, an edge server 300, and a device group 400, which are connected by a local area network (LAN) 102 and an internet 104. The device group 400 includes various devices capable of being connected by a network, for example, a client terminal 401, such as a personal computer and a work station, a digital camera 402, a smartphone 500, and a printer 600. Other than those, the device group 400 may include a device capable of being connected by a network, for example, a home appliance, such as a refrigerator, a television, and an air conditioner. The devices in the device group 400 are connected to one another by the LAN 102 and capable of connecting to the internet 104 via a router 103 installed in the LAN 102. The router 103 is shown schematically as a device that connects the LAN 102 and the internet 104, but it is also possible to cause the router 103 to have a wireless LAN access point function configuring the LAN 102. In this case, it is possible to configure each device included in the device group 400 so as to participate in the LAN 102 via a wireless LAN in addition to the connection with the router 103 by a wired LAN. For example, it may also be possible to configure the printer 600 and the client terminal 401 so as to be connected by a wired LAN and the smartphone 500 and the digital camera 402 so as to be connected by a wireless LAN. It is possible for the device group 400 and the edge server 300 to communicate with the cloud server 200 via the internet 104 to which connected via the router 103. It is possible for the edge server 300 and the device group 400 to communicate with each other via the LAN 102. In the present embodiment, the edge server 300 is arranged between the cloud server 200 and the device group 400. Then, the configuration is such that the printer 600 that makes a request for learning and inference to the edge server 300 does not access the cloud server 200 directly. Efficient data processing is enabled by adopting the system configuration in which a device that issues a request for learning and inference accesses only the edge server 300 arranged in the vicinity thereof as described above. The edge server 300 is arranged at a position nearer than the cloud server 200 in the network. Further, it is possible for the devices in the device group 400 to communicate with one another via the LAN 102. Further, it is possible for the smartphone 500 and the printer 600 to communicate with each other by near field wireless communication 101. As the near field wireless communication 101, those that use wireless communication in conformity with the Bluetooth (registered trademark) standard and the NFC standard are considered. Further, the smartphone 500 is also connected with a mobile telephone line network 105 and is also capable of communicating with the cloud server 200 via this line network 105. The configuration shown in FIG. 1 shows an example of the configuration of the image processing system and the configuration is not limited to this. For example, although the example is shown in which the router 103 comprises the access point function, it may also be possible to configure the access point by a device different from the router 103. Further, the connection between the edge server 300 and each device included in the device group 400 may be connection that uses communication means other than the LAN 102. For example, the connection may be connection that uses wireless communication, such as LPWA, ZigBee, Bluetooth, and RFID, wired communication, such as USB, and the like.

(Hardware Configuration of Server)

Figure 2:
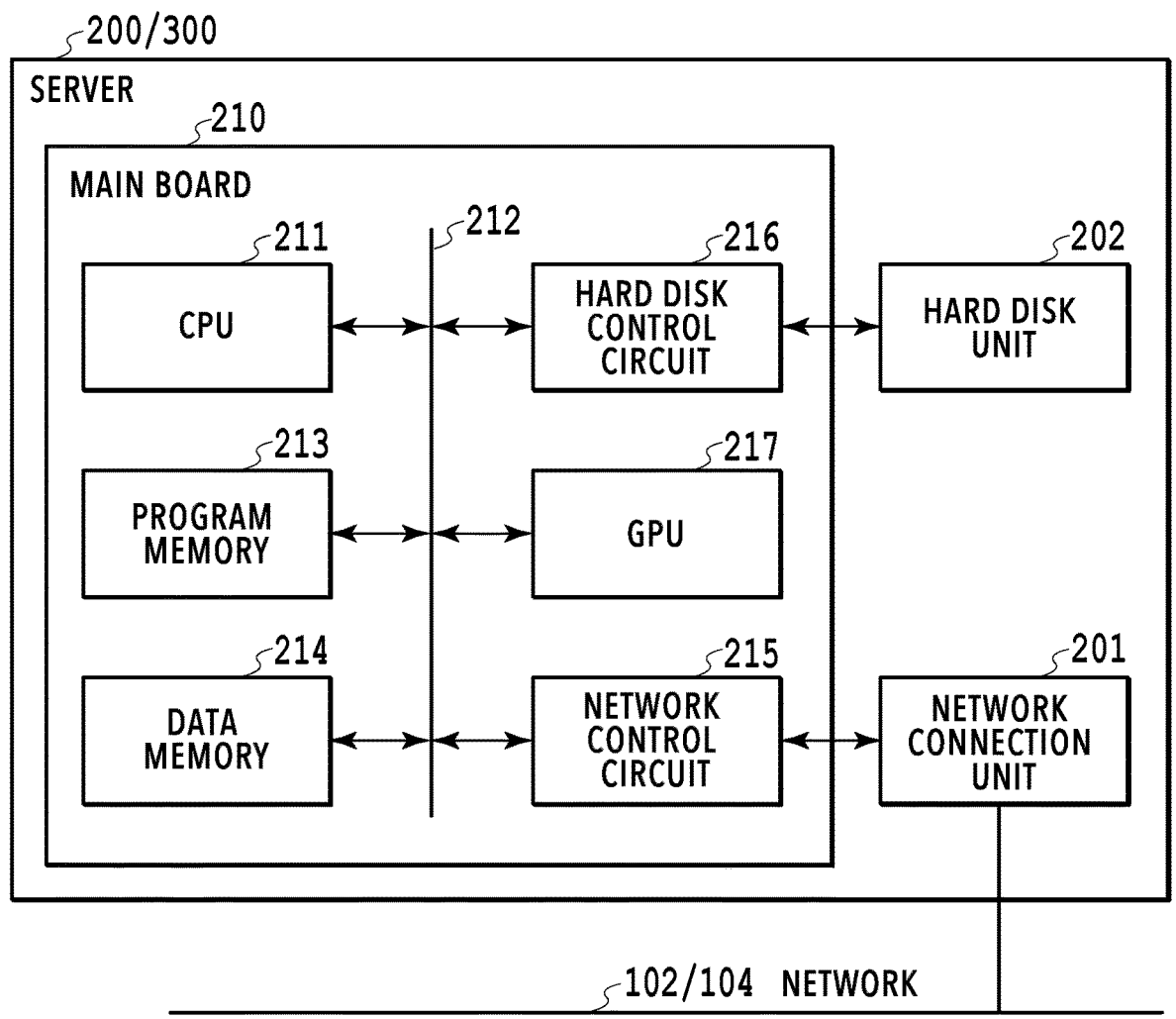
FIG. 2 is a block diagram showing a hardware configuration of a cloud server and an edge server.

FIG. 2 is a block diagram showing the hardware configuration of the cloud server 200 and the edge server 300. In the present embodiment, it is assumed that the cloud server 200 and the edge server 300 have the common hardware configuration. The servers 200/300 include a main board 210 that performs control of the entire apparatus, a network connection unit 201, and a hard disk unit 202. Further, the main board 210 has a CPU 211, an internal bus 212, a program memory 213, a data memory 214, a network control circuit 215, a hard disk control circuit 216, and a GPU 217.

The CPU 211 connects to a network, such as the internet 104 and the LAN 102, and communicates with other devices by controlling the network connection unit 201 via the network control circuit 215. Further, the CPU 211 writes data to the hard disk unit 202, reads stored data, and so on via the hard disk control circuit 216. In the hard disk unit 202, an OS and various kinds of control software used by being loaded onto the program memory 213 and various kinds of data are stored. The GPU 217 performs various kinds of calculation processing in place of or in cooperation with the CPU 211. It is possible for the GPU 217 to perform parallel processing of more data. Because of this, the GPU 217 is suitable to calculation processing in a case where learning is performed a plurality of times by using a learning model, as deep learning. In the present embodiment, it is assumed that the CPU 211 and the GPU 217 perform calculation in cooperation with each other at the time of executing a learning program in the cloud server 200. In the present embodiment, explanation is given on the assumption that the cloud server 200 and the edge server 300 have the common hardware configuration, but they may have different configurations. For example, the configuration of the cloud server 200 may be a configuration in which the GPU 217 is mounted and the configuration of the edge server 300 may be a configuration in which the GPU 217 is not mounted. Further, the performance of the GPU 217 mounted in the cloud server 200 may be different from the performance of the GPU 217 mounted in the edge server 300.

(Hardware Configuration of Smartphone)

Figure 3A:
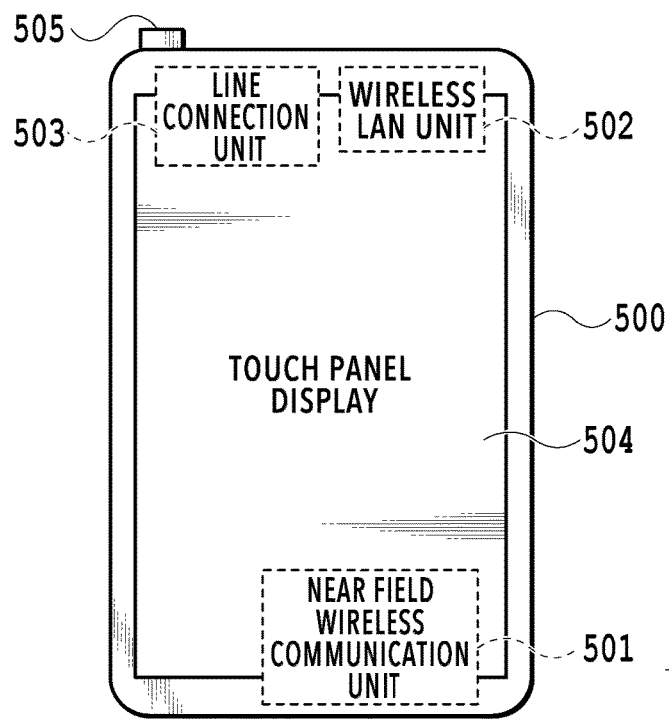
FIG. 3A is a perspective view of a smartphone and FIG. 3B is a block diagram showing an internal configuration of the smartphone.

FIG. 3A is a perspective view of the smartphone 500. Here, the smartphone refers to a multi-function type mobile telephone mounting functions as a camera, a net browser, and a mailer, in addition to the telephone function. A near field wireless communication unit 501 is a unit for communicating with a near field wireless communication unit, which is the communication destination located within a predetermined distance. A wireless LAN unit 502 is a unit for performing communication by connecting with the LAN 102 using a wireless LAN. A line connection unit 503 is a unit for performing communication by connecting to a mobile telephone line. A touch panel display 504 is provided on the front side of the smartphone 500 and comprises both a display mechanism adopting the LCD method and an operation mechanism adopting the touch panel method, In a case where a touch operation to a button-shaped operation part displayed on the touch panel display 504 is detected, an event that a button is pressed down is issued. A power source button 505 is used at the time of turning on and off the power source of the smartphone.

Figure 3B:
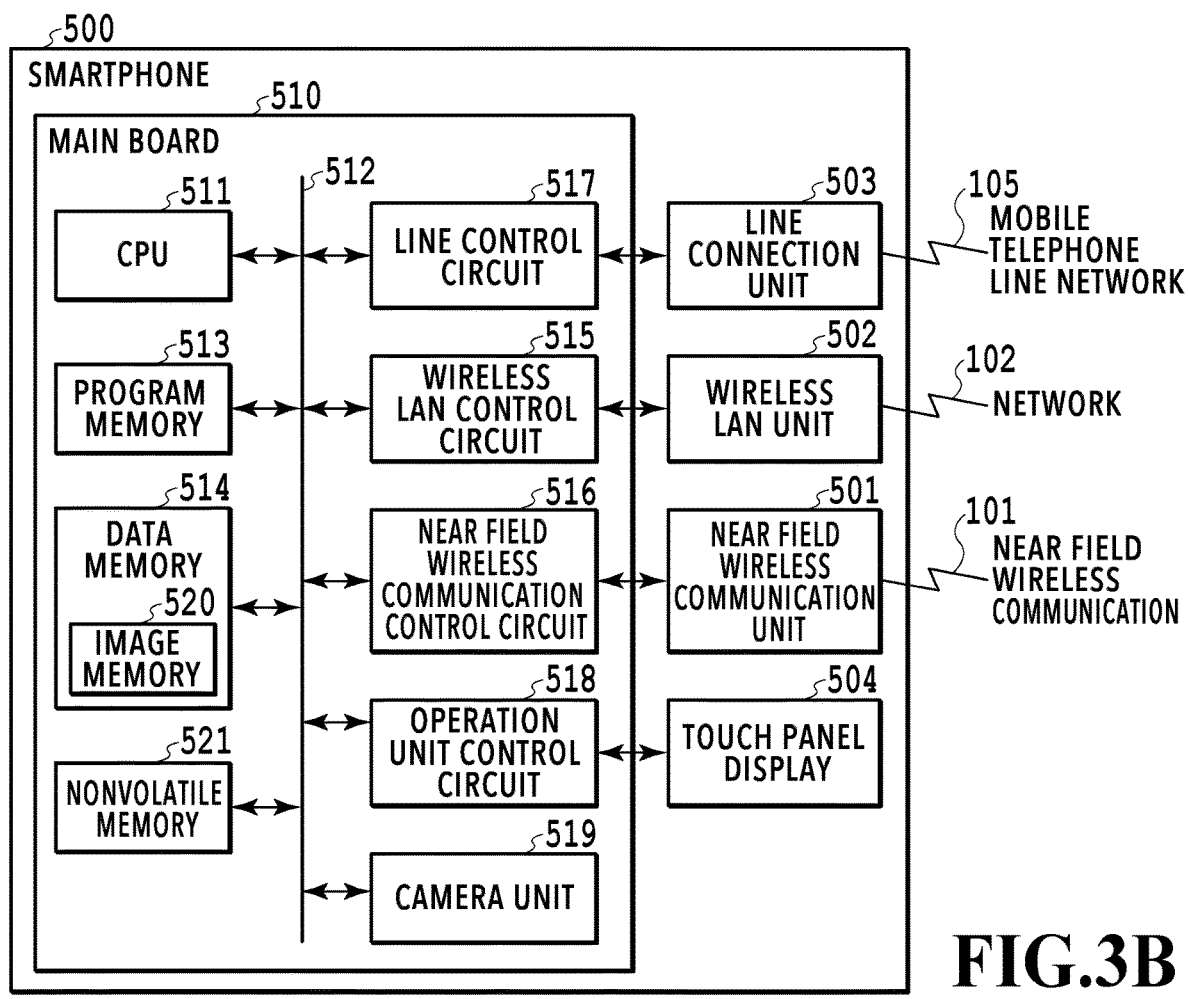

FIG. 3B is a block diagram showing the internal configuration of the smartphone 500. FIG. 3B shows a main board 510 that controls the entire smartphone 500, in addition to the near field wireless communication unit 501, the wireless LAN unit 502, the line connection unit 503, and the touch panel display 504, which are described above. The main board 510 has a CPU 511, an internal bus 512, a program memory 513, a data memory (including an image memory 520), various control circuits 515 to 518, a camera unit 519, and a nonvolatile memory 521.

The CPU 511 performs wireless LAN communication with another communication terminal device by controlling the wireless LAN unit 502 via the wireless LAN control circuit 515. Further, the CPU 511 performs transmission and reception of data with another near field wireless communication terminal by controlling the near field wireless communication unit 501 via the near field wireless communication control circuit 516. Further, the CPU 511 connects to the mobile telephone line network 105 by controlling the line connection unit 503 via the line control circuit 517 and places a call and performs transmission and reception of data. Further, the CPU 511 produces a desired display on the touch panel display 504, receives an operation from a user, and so on by controlling the operation unit control circuit 518. Further, it is possible for the CPU 511 to perform image capturing by controlling the camera unit 519. The captured image data is stored in the image memory 520 within the data memory 514. Further, it is also possible to store image data acquired from the outside through the LAN 102, the near field wireless communication 101, or the like in the image memory 520, in addition to the captured image data of the camera unit 519, and transmit image data to the outside on the contrary, and so on. The nonvolatile memory 521 includes a flash memory and the like and stores data desired to be saved even after the power source is turned off. In the nonvolatile memory 521, image data desired to be saved, in addition to, for example, telephone directory data, various kinds of communication connection information, information on devices connected in the past, and the like, or application software implementing various functions in the smartphone 500 or the like is stored.

(Hardware Configuration of Printer)

Figure 4A:
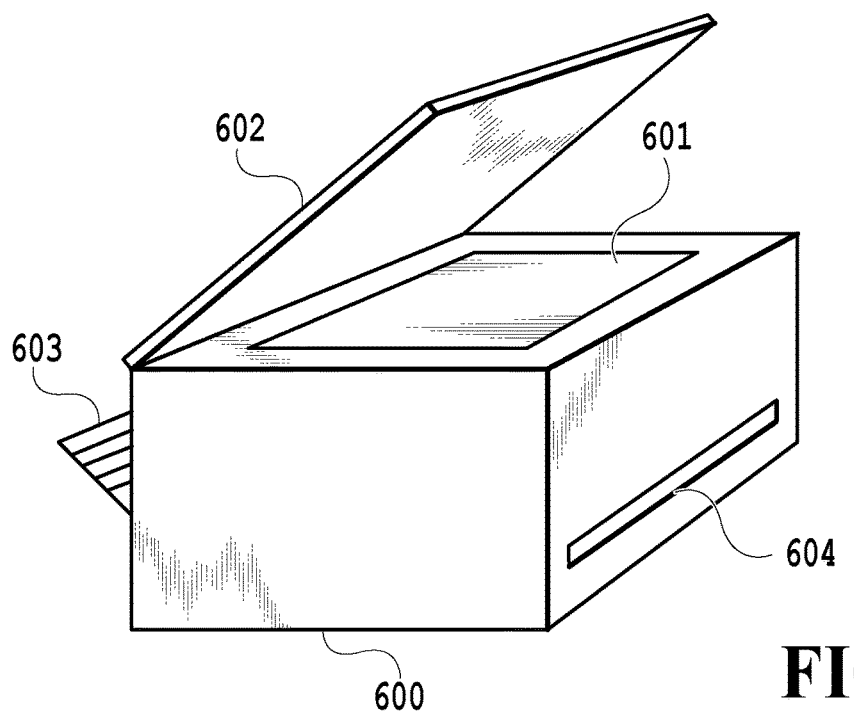
FIG. 4A is a perspective view of a printer 600 and FIG. 4B is a block diagram showing an internal configuration of the printer 600.

FIG. 4A is a perspective view of the printer 600. The printer 600 shown in FIG. 4A is a multi function printer (MFP) including the function as a scanner and other functions. A document table 601 is a transparent table made of glass and used in a case where a document is placed thereon and read by a scanner. A document table pressing plate 602 is a cover for preventing outside light from entering the scanner unit as well as pressing a document against the document table 601 in order to prevent the document from floating up at the time of performing reading by the scanner. On the top of the document table pressing plate 602, an operation panel, a near field wireless communication unit, and a wireless LAN antenna are provided. A printing sheet insertion slot 603 is an insertion slot at which sheets of a variety of sizes are set. The sheets set here are conveyed one by one to a printing unit and discharged from a printing sheet discharge port 604 after desired printing is performed.

Figure 4B:
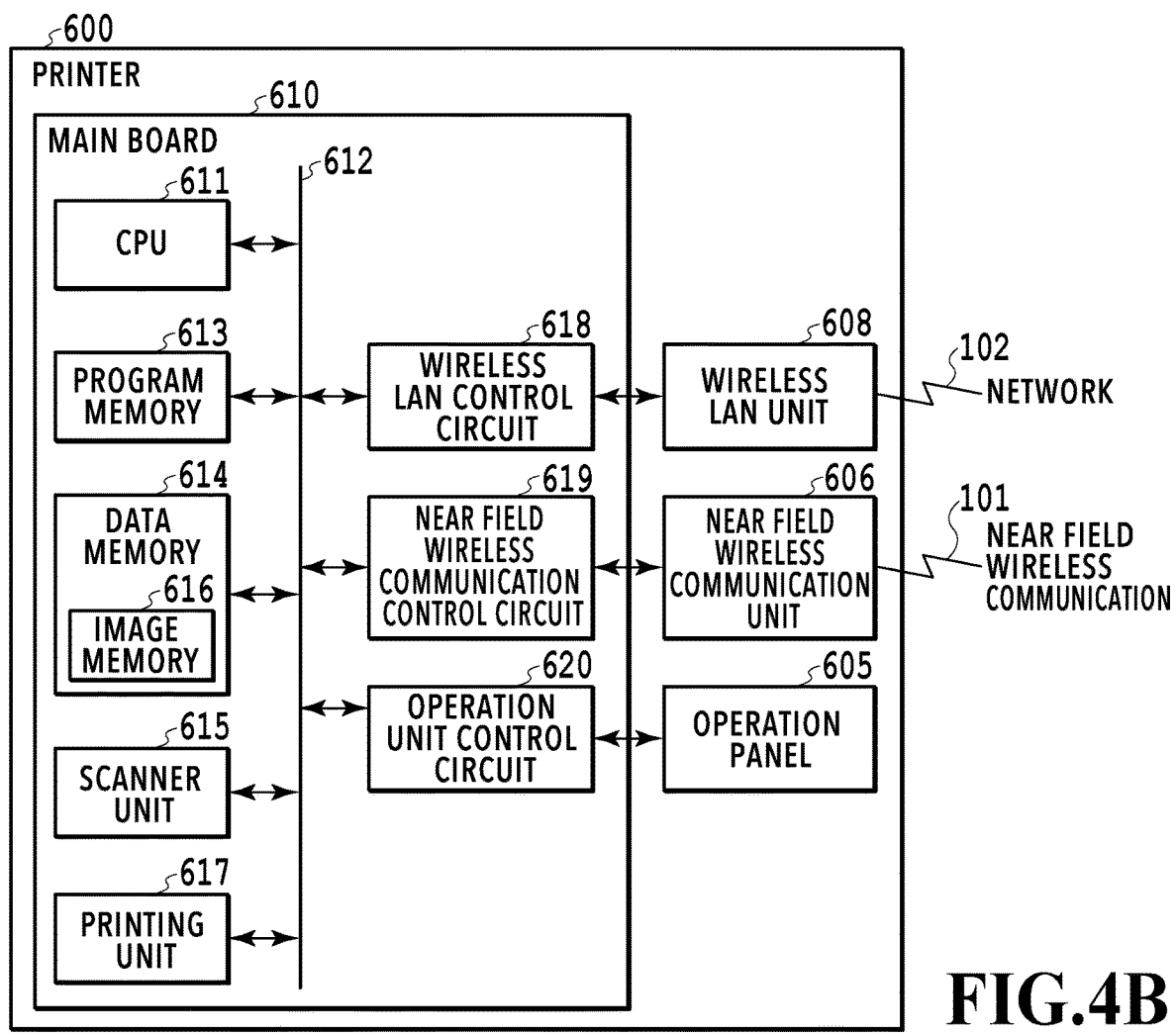

FIG. 4B is a block diagram showing the internal configuration of the printer 600. FIG. 4B shows a main board 610 that controls the entire printer 600, a wireless LAN unit 608, a near field wireless communication unit 606, and an operation panel 605. The main board 610 has a CPU 611, an internal bus 612, a program memory 613, a data memory (including an image memory 616), a scanner unit 615, a printing unit 617, and various control circuits 618 to 620.

The CPU 611 optically reads a document by controlling the scanner unit 615 and stores obtained scanned image data in the image memory 616. Further, it is possible for the CPU 611 to print the image data stored in the image memory 616 by controlling the printing unit 317. Further, the CPU 611 performs wireless LAN communication with another communication terminal device by controlling the wireless LAN unit 608 via the wireless LAN communication control unit 618. Further, the CPU 611 performs transmission and reception of data with another near field wireless communication terminal by controlling the near field wireless communication unit 606 via the near field wireless communication control circuit 619. Further, the CPU 611 produces a state display of the printer 600 on the operation panel 605, displays a function selection menu, receives an operation from a user, and so on, by controlling the operation unit control circuit 620. The operation panel 605 includes a backlight and the CPU 611 controls turn on and turn off of the backlight via the operation unit control circuit 621.

(Software Configuration of Image Processing System)

Figure 5:
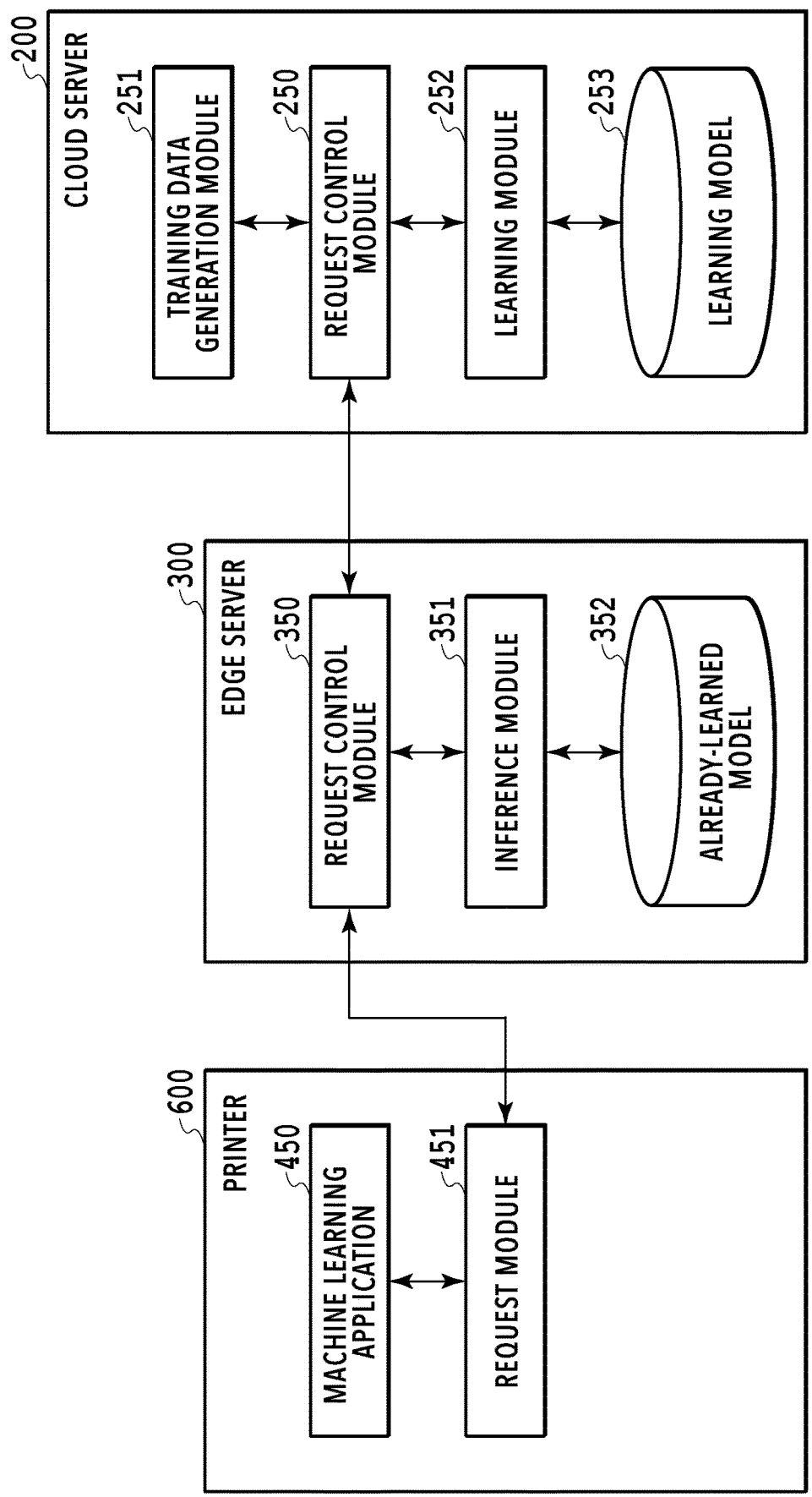
FIG. 5 is a block diagram showing a software configuration of the image processing system.

FIG. 5 is a block diagram showing the software configuration of the image processing system 100. In FIG. 5, among the software configurations possessed by the image processing system 100, only the modules relating to learning and inference of the color space of image data are described. In FIG. 5, modules (OS, various kinds of middleware, maintenance applications and the like) relating to other functions are omitted.

The cloud server 200 comprises three software modules, that is, a request control module 250, a training data generation module 251, and a learning module 252, and a learning model 253. The request control module 250 receives a learning request that is sent from a request control module 350 of the edge server 300. Further, the request control module 250 transmits the learning model 253 after updating in a case where the learning model 253 is updated by learning to the edge server 300. The training data generation module 251 generates training data that can be processed by the learning module 252 from the image file relating to the learning request. Here, the training data is data including a set of input data X of the learning module 252 and supervised data T. The learning module 252 performs learning by using the training data received from the training data generation module 251. The contents of the learning model 253 change by accumulating the results of learning performed by the learning module 252 (updating of the learning model 253). In the present embodiment, explanation is given by taking a case as an example where deep learning, which is one of machine learning methods, is performed. In the deep learning, the weighting parameter between each node of a neural network having two or more intermediate layers is optimized. Due to this, it is possible to classify input data, determine an evaluation value, and so on. The learning model 253 after the updating, in which the learning results are reflected, is distributed to the server 300 as an already-learned model and used for inference processing. At this time, it may also be possible to distribute the entire learning model 253 after the updating or extract only a portion necessary for inference and distribute the portion.

The edge server 300 comprises two software modules, that is, the request control module 350 and an inference module 351, and an already-learned model 352. The request control module 350 performs processing to transfer a learning request received from each device to the cloud server 200 along with a learning-target image file. Further, it is also possible to transmit the image file collected by the edge server 300 itself to the cloud server 200 along with a learning request. Further, the request control module 350 receives an inference request from each device. Then, the inference module 351 performs inference by using the above-described already-learned model by taking the image data attached to the inference request as the input data X. In the present embodiment, the color space of image data to which color space identification information is not attached is inferred. The inference results are returned to the device having transmitted the inference request (the printer 600 in the present embodiment) by the request control module 350.

The printer 600 has a machine learning application 450 and a request module 451. The machine learning application 450 is an application for using the mechanism of learning and inference by machine learning. The request module 451 is a module that makes a request to the edge server 300 to perform learning or inference. In the learning phase, by instructions from the machine learning application 450, a learning request is transmitted to the edge server 300 along with a learning-target image file. Further, in the inference phase, by instructions from the machine learning application 450, an inference request is transmitted to the edge server 300 along which an inference-target image file and further, inference results returned from the edge server 300 are received. In the present embodiment, the configuration is such that the printer 600 issues a request for learning and inference. In a case of a configuration in which a request for learning and inference is issued from another device included in the device group 400, the other device comprises the machine learning application 450 and the request module 451, which are described above. In the present embodiment, the configuration is such that learning is performed in the cloud server 200 and the learning model 253 having accumulated the learning results is distributed to the edge server 300 as the already-learned model 352 and inference is performed in the edge server 300, but the configuration is not limited to this aspect. It is sufficient to determine where to perform learning and inference within the image processing system by taking into consideration the distribution of hardware resources, the amount of calculation, the amount of communication data, and the like. Alternatively, a configuration may be accepted in which it is possible to dynamically change the portion at which learning and inference are performed in accordance with the distribution of hardware resources, an increase or a decrease in the amount of calculation and the amount of communication data.

(Outline of Learning Phase and Inference Phase)

Figure 6A:
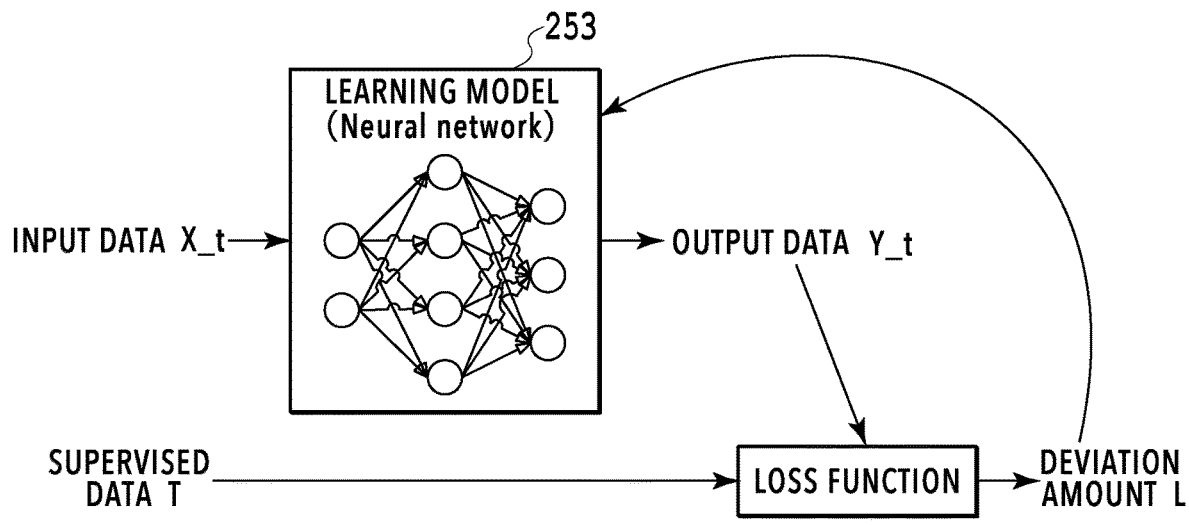
FIG. 6A is a conceptual diagram showing a structure of input and output at the time of performing learning by using a learning model and FIG. 6B is a conceptual diagram showing a structure of input and output at the time of performing inference by using an already-learned model.

Following the above, the learning phase and the inference phase in deep learning are explained briefly. FIG. 6A is a conceptual diagram showing a structure of input and output at the time of performing learning by using the above-described learning model 253 and FIG. 6B is a conceptual diagram showing a structure of input and output at the time of performing inference by using the above-described already-learned model 352

In FIG. 6A, input data X_t is data in the input layer of the neural network of the learning model 253. As the results of recognizing the input data X_t by using the learning model 253, output data Y_t is output. In the learning phase, as the correct-answer data for recognition results of the input data X_t, the supervised data T is given. By giving the output data Y_t and the supervised data T to a loss function, a deviation amount L from correct-answer data for the recognition results is obtained. Then, coupling weighting coefficients between noses of the neural network and the like are updated so that the deviation amount L obtained for a large number of pieces of input data X_t becomes small (error back-propagation method). In the present embodiment, as the method of machine learning, deep learning is supposed, but it is also possible to apply the present embodiment to another kind of machine learning algorithm (for example, nearest neighbor method, Naive Bayes method, decision tree, support vector machine, and the like).

Figure 6B:
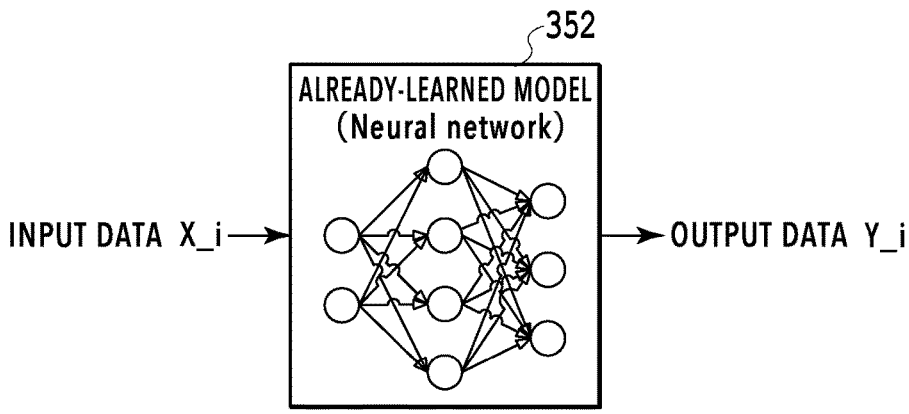

In FIG. 6B, input data X_t is data in the input layer of the neural network of the already-learned model 352. As the results of recognizing the input data X_t by using the already-learned model 352, output data Y_t is output. In the inference phase, this output data Y_t is used as the inference results. Here, explanation is given by assuming that the already-learned model 352 in the inference phase comprises the neural network equivalent to that of the learning model 253 in the learning phase. However, this is not limited and it is also possible to prepare those obtained by extracting only the portions necessary in the inference phase from the learning model 253 as the already-learned model 352. Due to this, it is possible to reduce the data amount of the already-learned model 352, reduce the processing time of the inference phase, and so on.

(Review of Problem)

In the present embodiment, in the scene in which image data obtained by performing image capturing by the smartphone 500 is transmitted to the printer 600 and printed, in a case where color space identification information indicating the color space is not attached to the image data, the color space is inferred by using machine learning. Normally, for the image data obtained by performing image capturing by an image capturing apparatus, a variety of kinds of standard color spaces, such as sRGB and AdobeRGB, are used in order to adapt to the color reproduction characteristic of the image capturing apparatus or adapt to the color reproduction characteristic of an apparatus that uses the image data. Then, depending on which standard color space is used, the color to be reproduced is different even though the pixel value of the image data is the same. Because of this, at the time of performing printing processing by the printer 600, it is necessary to specify the color space used in the input image data and perform image processing, such as color space conversion processing, in accordance therewith. However, depending on the creation method of an image file or the method of transmission and reception thereof, there is a case where color space identification information is not attached to the received image data, and therefore, it is not possible to specify the color space. Consequently, in the present embodiment, in the scene in which the printer 600 performs printing processing for the input image data, in a case where it is possible to specify the color space of the input image data by color space identification information, the learning model is updated by performing machine learning. Then, in a case where color space identification information is not attached to input image data, and therefore, it is not possible to specify the color space thereof, the color space is inferred by using the already-learned model.

(Data Structure of Image File)

Figure 7A:
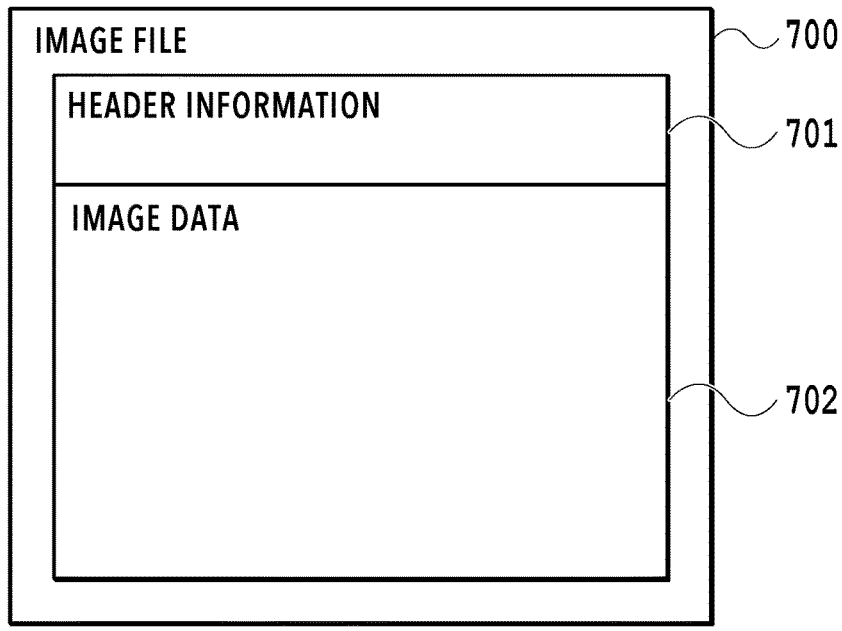
FIG. 7A and FIG. 7B are each a diagram showing a data structure of an image file in a JPEG format.
Figure 7B:
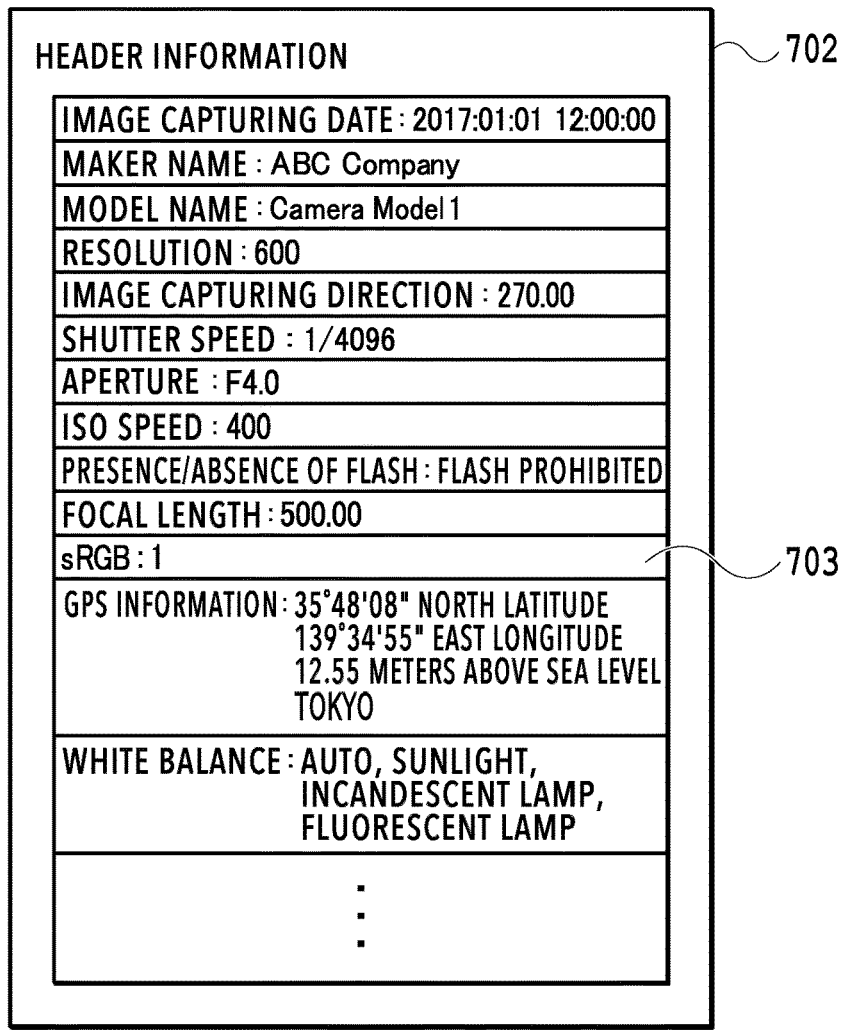

Before explaining the image processing system 100 in detail, the data structure of an image file that is input to the printer 600 is explained. FIG. 7A and FIG. 7B are each a diagram showing the data structure of an image file in the JPEG format. FIG. 7A shows the entire structure of an image file 700. In the image file 700, header information (metadata) 701 in which JPEG information and Exif information are stored exists, in addition to image data 702, and in the header information 701, a variety of kinds of information are stored. FIG. 7B shows an example of the Exif information stored in the header information 701. In the header information 701, as color space identification information, flag information indicating whether or not the color space is sRGB (sRGB in a case of "1" and other than sRGB in a case of "0") is stored and whether the color space is sRGB is specified by the flag information.

The color space identification information may be configured as a metadata file separate from the image file 700 in place of being configured as a part of the header information 701. Further, the color space identification information is not limited to the flag information indicating whether or not the color space is a specific standard color space. For example, in a case where it is possible to check that the following four conditions hold from the Exif information, it is possible to analogically infer that the color space is AdobeRGB.

Condition 1: the value of the above-described flag information is "0" (not sRGB)

Condition 2: the white point is x=0.31, y=0.33 (D65)

Condition 3: the RGB light source is r.x=0.64, r.y=0.33, g.x=0.21, g.y=0.33, b.x=0.15, b.y=0.03

Condition 4: the gamma value is 2.2

As described above, a combination of a plurality of pieces of information capable of analogically inferring a specific standard color space may be color space identification information.

Figure 8A:
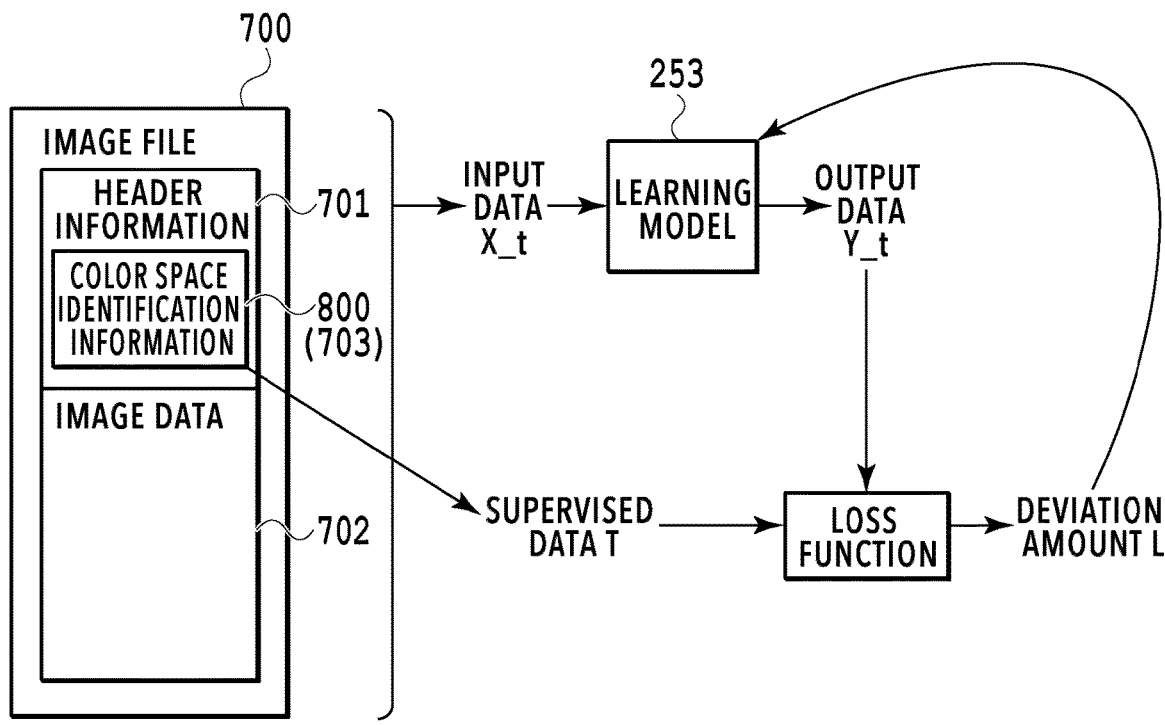
FIG. 8A is an explanatory diagram of input and output in a learning phase and FIG. 8B is an explanatory diagram of input and output in an inference phase.

FIG. 8A is an explanatory diagram of input and output in the learning phase of the present embodiment. The input data X_t is data including the whole of the image file 700, that is, data including all the head information 701 and the image data 702 and in the header information 701, the color space identification information described previously is included. Then, in the learning model 253, color space prediction is performed by focusing attention on information that can be extracted from the image data 702, for example, the distribution of pixel values, the shape of an object, and the like. Further, it may also be possible to perform color space prediction by using information at the time of image capturing (shutter speed, aperture, ISO speed, presence/absence of strobe flash, setting of white balance, and the like), which is included in the header information 701 described above. The object of the present embodiment is to infer the color space in the image data to which color space identification information is not attached by using an already-learned model. Because of this, color space identification information 800 included in the header information 701 is used only as the supervised data T and ignored in the prediction stage of the color space in the learning model 253. That is, in the learning phase of the present embodiment, by using a large number of image files 700 as an input, the color space is predicted and classified and learning is performed repeatedly so that the deviation amount L from the color space specified by the color space identification information 800, which is the supervised data T, becomes the minimum. For example, for the output data Y_t, an example is such that the probability of being sRGB is XX %, the probability of being AdobeRGB is YY %, and the probability of being Display3 is ZZ %. In this manner, the learning model 253 is updated. The supervised data T in the present embodiment is only required to be data capable of specifying the correct color space. That is, the color space identification information 800 as the supervised data T may be a single piece of information, such as flag information, or may be a combination of a plurality of pieces of information.

Figure 8B:
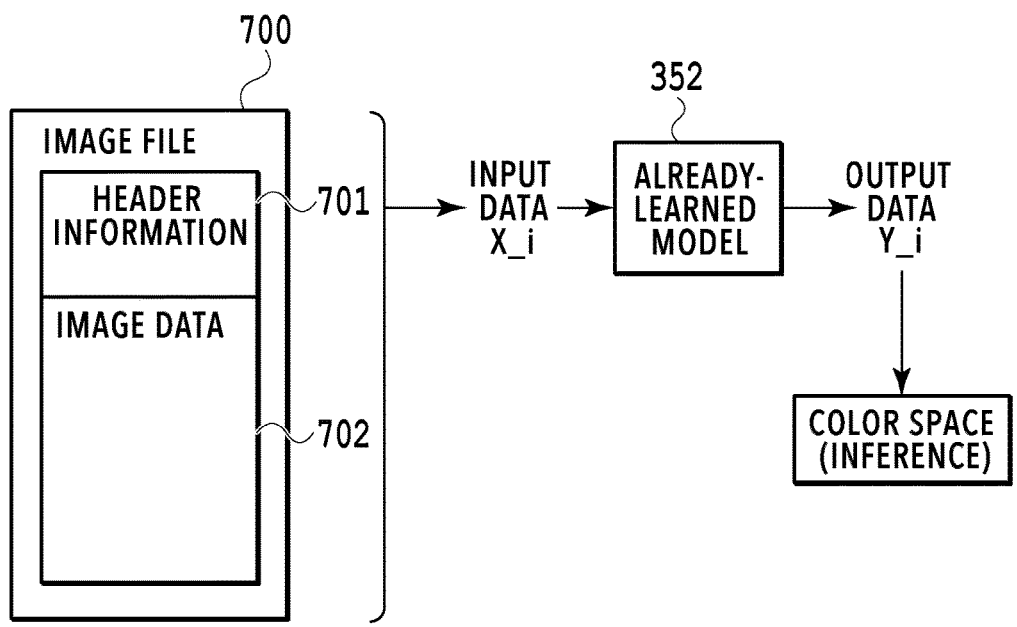

FIG. 8B is an explanatory diagram of input and output in the inference phase of the present embodiment. The input data X_i is data including the whole of the image file 700, that is, data including all the header information 701 and the image data 702. However, different from the input data X_t in the learning phase, the header information 701 does not include the color space identification information 800. The output data Y_i obtained as the results of the inference by the already-learned model 352 is information specifying the color space deemed to be used in the input data X_i. The printer 600 performs necessary image processing, such as color space conversion processing for input image data, in accordance with the color space specified by the output data Y_i. The color space conversion processing in this case refers to processing to convert the color space of the input image data in accordance with the color reproduction characteristic possessed by the printer 600.

(Operation of Entire Image Processing System)

Following the above, the operation of the entire image processing system 100 according to the present embodiment is explained.

<Learning Phase>

Figure 9:
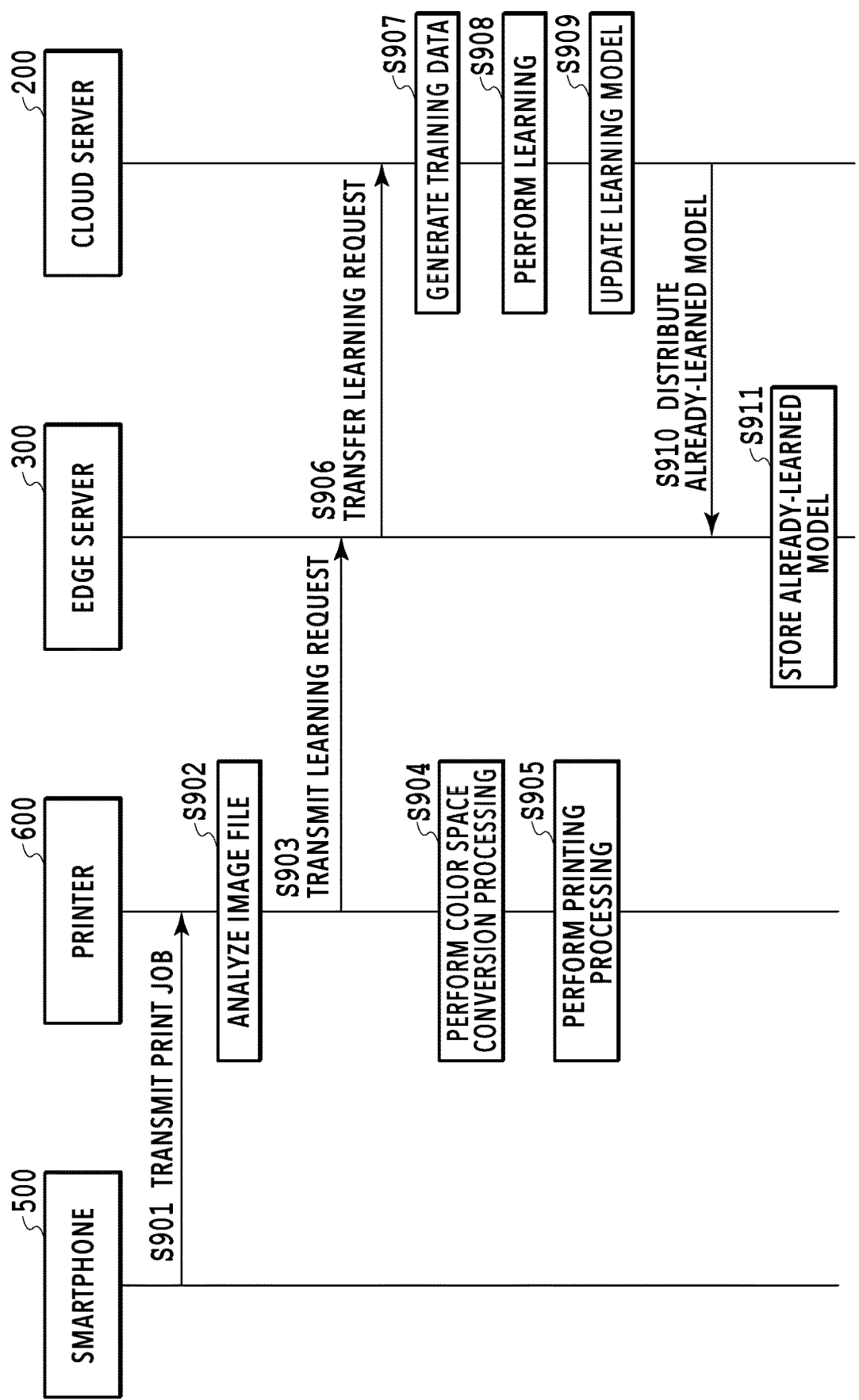
FIG. 9 is a sequence diagram showing operations of the entire image processing system in the learning phase.

FIG. 9 is a sequence diagram showing the operation of the entire image processing system 100 in the learning phase. In the following, along FIG. 9, the operation in the learning phase of the present embodiment is explained.

First, from the smartphone 500, a print job is transmitted to the printer 600 (S901). In the print job, the image file described previously is included. The printer 600 having received the print job analyzes the image file (S902). Here, it is assumed that in the image file, color space identification information is included. Based on analysis results, the printer 600 transmits a learning request to the edge server 300 (S903). After that, the printer 600 performs color space conversion processing for the image data within the image file. At this time, optimum conversion based on the color space specified by the color space identification information stored in the header information 701 is performed for the image data. Then, the printer 600 performs printing processing by using the image data for which the color space conversion processing has already been performed (S905).

On the other hand, the edge server 300 having received the learning request from the printer 600 transfers the learning request to the cloud server 200 (S906). In the cloud server 200 having received the learning request, first, the training data described previously is generated from the image file attached to the received learning request (S907). Next, learning using the training data is performed (S908). For example, in a case of learning of classification type, learning results, such as the probability of being sRGB is 89%, the probability of being AdobeRGB is 2%, and the probability of being DisplayP3 is 0.1%, are obtained. Then, based on the learning results such as those, the learning model 253 is updated (S909). Specifically, the parameters of the learning model 253 are adjusted so that the difference (deviation amount L) between the output results of classification type as described above and the color space specified by the color space identification information as the supervised data T becomes close to 0. Here, for example, it is assumed that the color space specified by the color space identification information included in the head information is sRGB. As a result of that, the deviation amount from sRGB is specified as 11% and the parameters of the learning model 253 are adjusted so that the deviation amount becomes 0%. In a case where learning is completed in this manner, the cloud server 200 distributes the learning model 253 after the updating (or a part thereof) to the edge server 300 as the already-learned model 352. The edge server 300 having received the already-learned model 352 from the cloud server 200 reflects the contents thereof in the already-learned model 352 possessed by the edge server 300 itself and stores the already-learned model 352 (updating of already-learned model). Due to this, in the subsequent inference phase, the already-learned model 352 after updating is used.

<Inference Phase>

Figure 10:
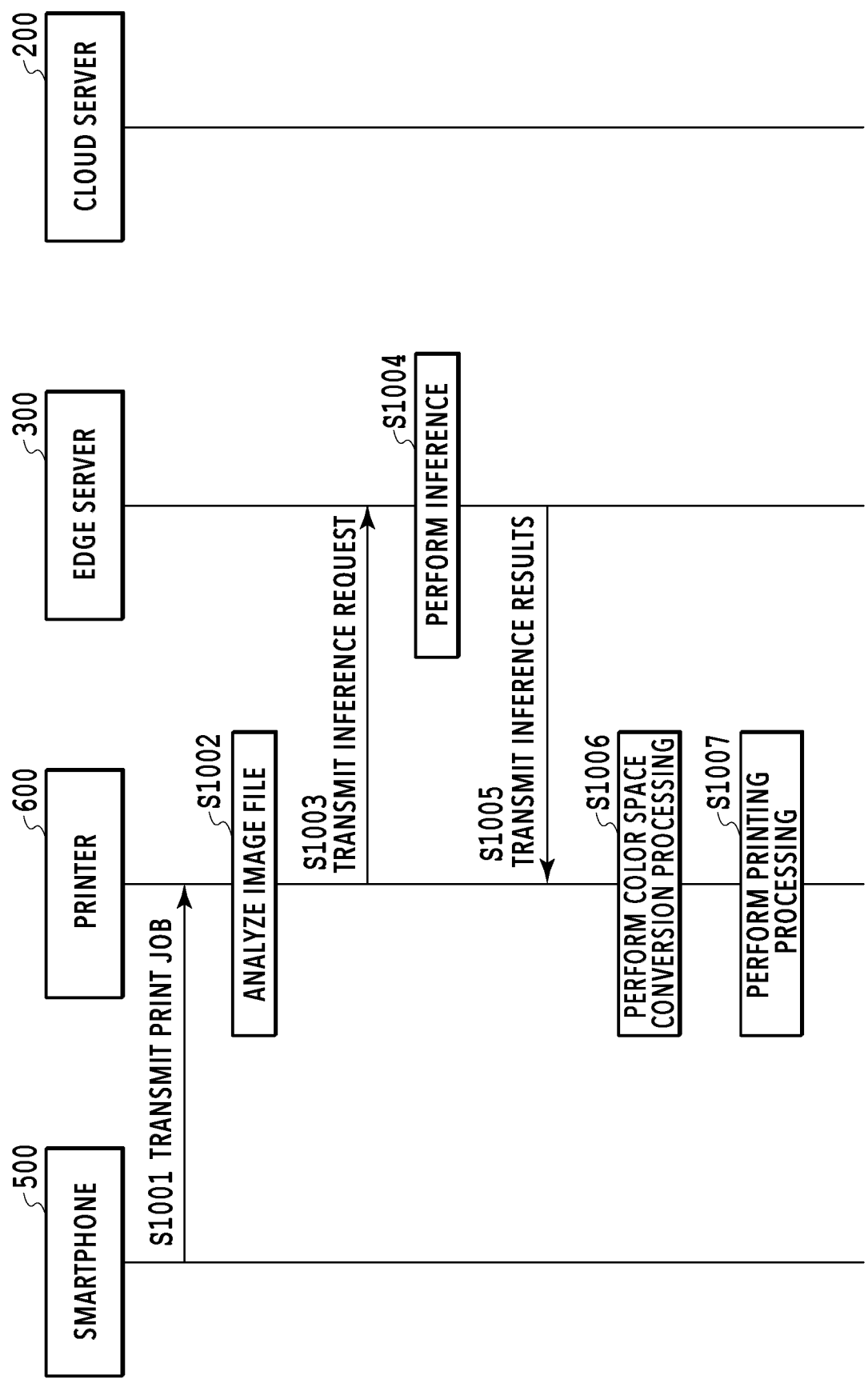
FIG. 10 is a sequence diagram showing operations of the entire image processing system in the inference phase.

FIG. 10 is a sequence diagram showing the operation of the entire image processing system 100 in the inference phase. In the following, along FIG. 10, the operation in the inference phase of the present embodiment is explained.

First, from the smartphone 500, a print job is transmitted to the printer 600 (S1001). In the print job, the image file described previously is included. The printer 600 having received the print job analyzes the image file (S1002). Here, it is assumed that color space identification information is not included in the image file. Based on analysis results, the printer 600 transmits a request for inference of the color space to the edge server 300 along with the image file (S1003).

The edge server 300 performs inference processing using the already-learned model 352 in accordance with the received inference request. Specifically, processing to infer the color space of the image data included in the received image file by using the already-learned model 352 is performed (S1004). At this time, in a case where the already-learned model 352 is obtained by learning of classification type, the inference results of classification type are output. For example, as in the learning results of classification type described above, the probability of being sRGB is 90%, the probability of being AdobeRGB is 1%, the probability of being DisplayP3 0.2%, and so on. In a case where the inference is completed in this manner, the edge server 300 transmits the inference results to the printer 600 (S1005).

The printer 600 having received the inference results of the color space performs color space conversion processing for the image data within the input image file in accordance with the inference results (in a case of the classification type, by specifying the image data as image data of the color space whose probability is the highest among a plurality of color space candidates) (S1006). Then, the printer 600 performs printing processing by using the image data for which the color space conversion processing has already been performed (S1007). At S1005, it may also be possible for the edge server 300 to report the color space information whose probability is the highest as the inference results. That is, in the embodiment described above, the edge server 300 receives that the probability of being sRGB is 90%, the probability of being AdobeRGB is 1%, and the probability of being DisplayP3 is 0.2% as the inference results. It may also be possible for sRGB whose probability is the highest among those to be output as the inference results.

(Flow of Processing in Printer)

Figure 11:
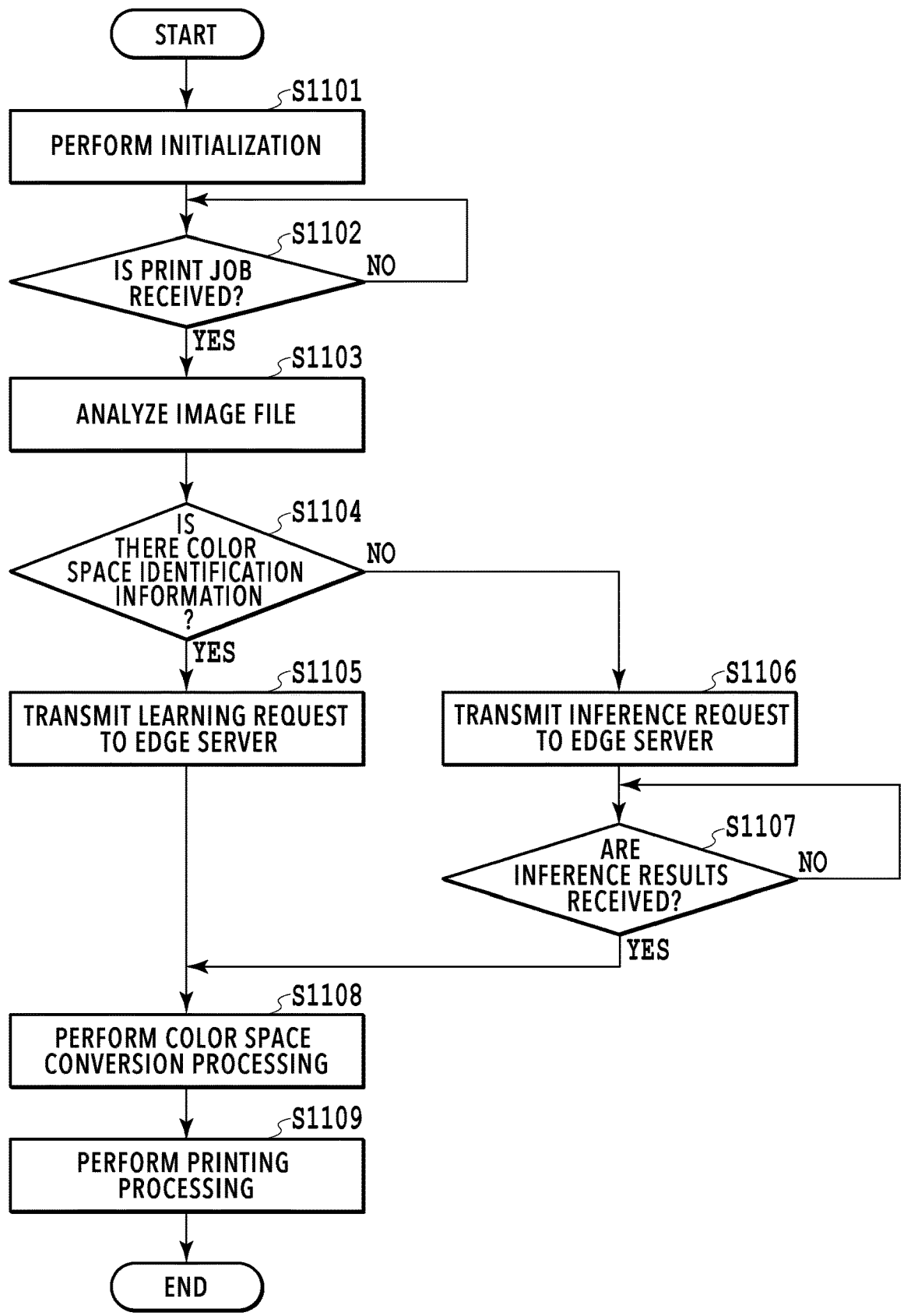
FIG. 11 is a flowchart showing a flow of processing in the printer.

FIG. 11 is a flowchart showing a flow of processing in the printer 600. This processing is implemented by the CPU 611 executing, in response to the power source of the printer 600 being turned on, the control program corresponding to the machine learning application 450 stored in the program memory 613. The flowchart shown in FIG. 11 describes the processing relating to the present embodiment and other pieces of processing are not shown schematically. Further, in the following explanation, symbol "S" represents a step.

At S1101, initialization processing of each unit within the apparatus is performed. At S1102 that follows, processing to check whether a print job has been received from an external device, such as the smartphone 500, is performed. Until reception of a print job is detected, this step is performed repeatedly at predetermined intervals. Then, in a case where reception of a print job is detected, the processing advances to S1103.

At S1103, analysis processing of the image file included in the received print job is performed. The present embodiment premises that the image file is sent by being included in the print job, but the present embodiment is not limited to this. For example, a configuration may also be accepted in which address information indicating the storage location of the image file is included in the print job and the printer 600 accesses the storage location and acquires the image file by referring to the address information. Alternatively, a configuration may be accepted in which printing is performed by using the image file already stored in the data memory 616 of the printer 600.

At S1104, whether or not the color space identification information described above is included in the header information on the image file analyzed at S1103 is checked. In a case where the color space identification information is included, the processing advances to S1105 and in a case where the color space identification information is not included, the processing advances to S1106.

At S1105, a learning request for execution of the learning described previously by the cloud server 200 is transmitted to the edge server 300 along with the image file by the request module 451. After the transmission of the learning request, the processing advances to S1108.

At S1106, an inference request for execution of the inference described previously by the edge server 300 is transmitted to the edge server 300 along with the image file by the request module 451. Then, at S1107, whether inference results as a response to the transmitted inference request are received is checked. This check processing is performed repeatedly at predetermined intervals until reception of the inference results is detected as at S1102. Then, in a case where reception of the inference results is detected, the processing advances to S1108.

At S1108, color space conversion processing is performed for the image data within the image file. At this time, in a case where the processing advances to this step from S1105, conversion is performed from the color space specified by the color space identification information stored in the header information on the image file into a color space suitable to the printing processing in the printer 600. On the other hand, in a case where the processing advances to this step from S1107, conversion is performed from the color space specified based on the inference results received from the edge server 300 into a color space suitable to the printing processing in the printer 600.

Lastly, at S1109, the printing processing is performed by the printing unit 617. The above is the flow of the processing in the printer 600. In the present embodiment, the analysis (S1103) of the image file is performed on the printer side, but it may also be possible to design the configuration so that the analysis of the image file is also performed on the server side. On the contrary, it may also be possible to design the configuration so that all the pieces of processing including learning and inference are performed on the printer side.

(Flow of Processing in Edge Server)

Figure 12:
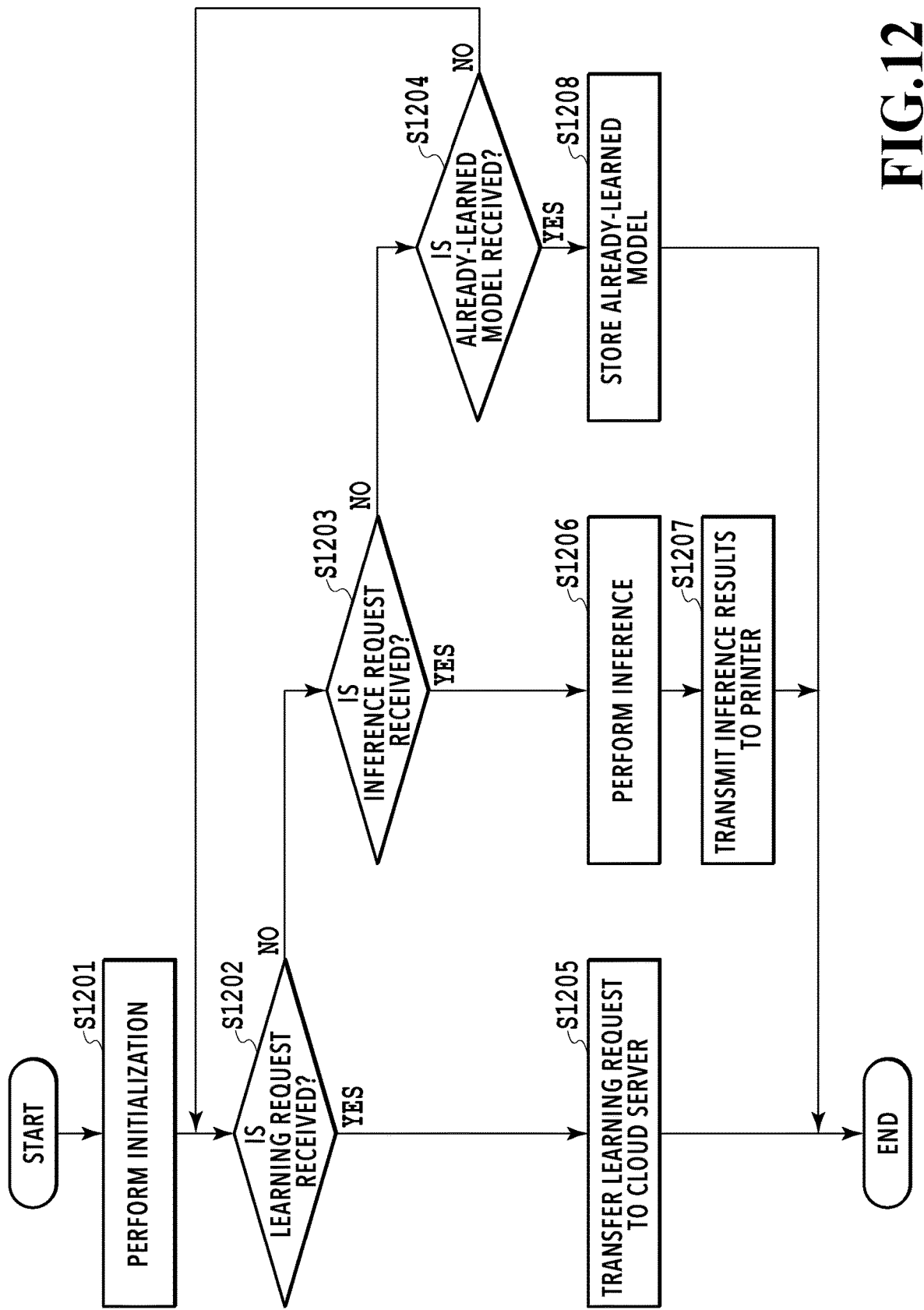
FIG. 12 is a flowchart showing a flow of processing in the edge server.

FIG. 12 is a flowchart showing a flow of processing in the edge server 300. This processing is implemented by the CPU 211 loading, in response to the power source of the edge server 300 being turned on, the control program stored in the hard disk unit 202 onto the program memory 213 and executing the program. The flowchart shown in FIG. 12 describes the processing relating to the present embodiment and other pieces of processing are not shown schematically. Further, in the following explanation, symbol "S" represents a step.

At S1201, initialization processing of each unit within the apparatus is performed. At S1202 to S1204 that follow, processing to check reception of various commands from the outside is performed repeatedly at predetermined intervals by the request control module 350.

In a case where reception of a learning request from the printer 600 is detected (Yes at S1202), the processing advances to S1205 and processing to transfer the received learning request to the cloud server 200 is performed.

In a case where reception of an inference request from the printer 600 is detected (Yes at S1203), the processing advances to S1206 and inference corresponding to the received inference request is performed. Specifically, processing to infer the color space of the image data included in the image file that is sent along with the inference request is performed by the inference module 351 using the already-learned model 352. In a case where the inference is completed, the processing advances to S1207 and the inference results are transmitted to the printer 600 having made the request.

In a case where reception of the already-learned model 352 from the cloud server 200 is detected (Yes at S1204), the processing advances to S1208 and the contents of the received already-learned model 352 are reflected in the existing already-learned model 352 (updating of already-learned model). Due to this, the already-learned model 352 after the updating is used for the subsequent inference requests.

The above is the flow in the edge server 300.

(Flow of Processing in Cloud Server)

Figure 13:
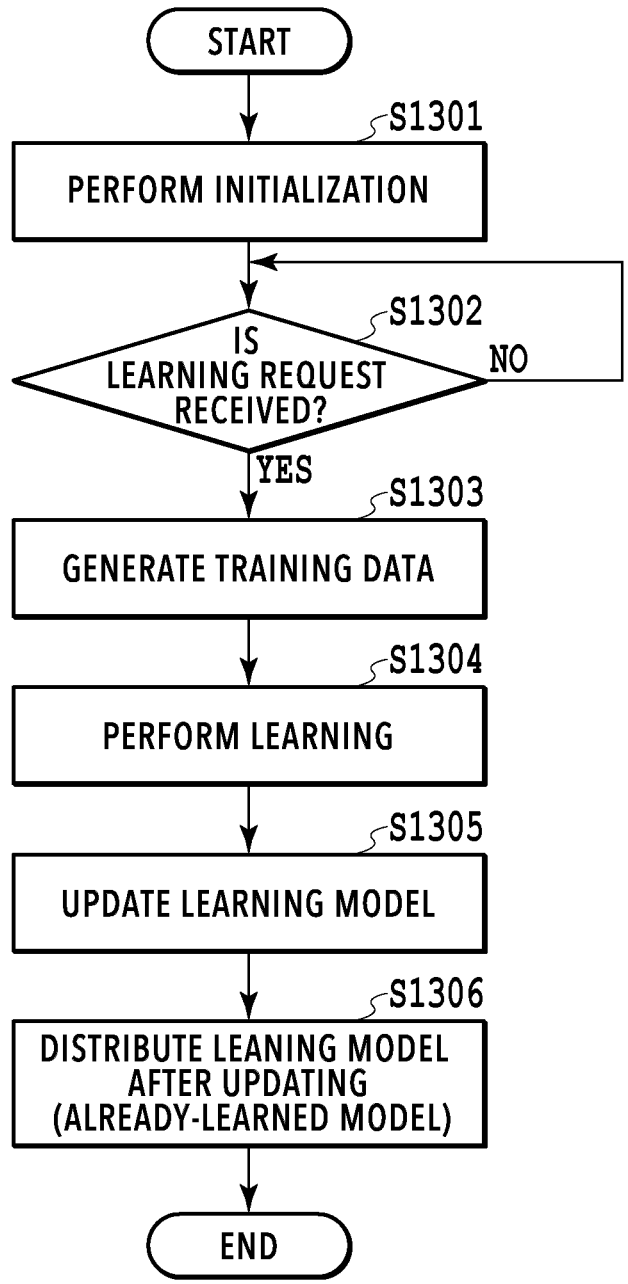
FIG. 13 is a flowchart showing a flow of processing in the cloud server.

FIG. 13 is a flowchart showing processing contents of the cloud server 200. This processing is implemented by the CPU 211 loading, in response to the power source of the cloud server 200 being turned on, the control program stored in the hard disk unit 202 onto the program memory 213 and executing the program. The flowchart shown in FIG. 13 describes the processing relating to the present embodiment and other pieces of processing are not shown schematically. Further, in the following explanation, symbol "S" represents a step.

At S1301, initialization processing of each unit within the apparatus is performed. At S1302 that follows, processing to check reception of a learning request from the edge server 300 is performed repeatedly at predetermined intervals by the request control module 250. Then, in a case where reception of a learning request is detected, the processing advances to S1303.

At S1303, by the training data generation module 251, training data (data including a set of image data as input data X_t and color space identification information as supervised data T) is generated. At S1304 that follows, based on the generated training data, learning for the learning model 253 is performed by the learning module 252. At S1305 that follows, the learning results are reflected in the learning model 253 and the learning model 253 is updated.

At S1306, by the request control module 250, the learning model 253 after the updating is transmitted to the edge server 300 as the already-learned model 352.

The above is the flow of the processing in the cloud server 200.

<Modification Example>

In the present embodiment, the configuration is such that learning is performed each time a learning request is received, but the configuration is not limited to this. For example, it may also be possible to design a configuration in which the received learning request is saved in advance and learning is performed at timing asynchronous with the reception of the learning request. Further, it may also be possible to design a configuration in which the already-learned model is distributed periodically at predetermined intervals in place of distributing the already-learned model each time learning is performed or the already-learned model is distributed in response to a distribution request from the edge server 300.

Figure 14:
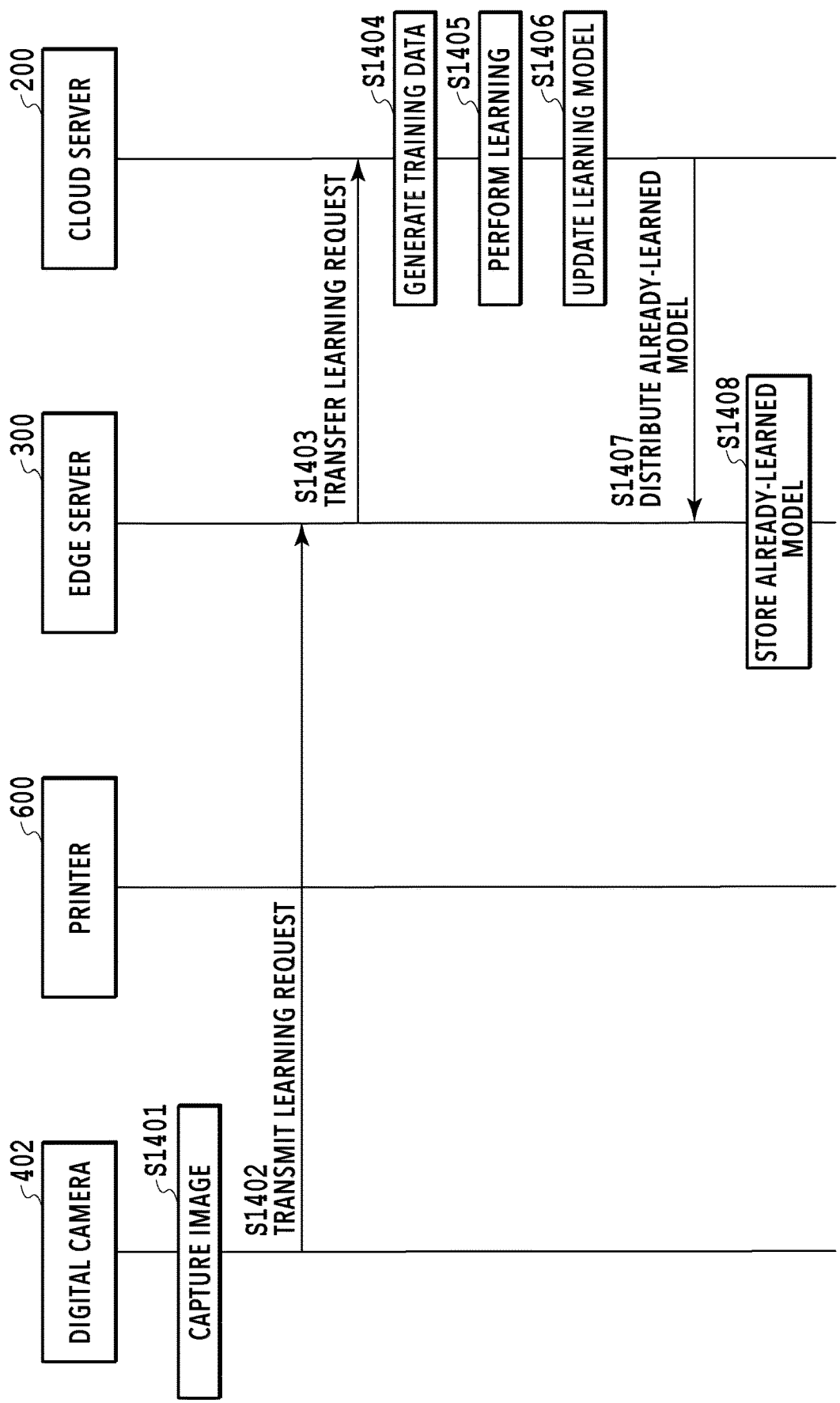
FIG. 14 is a sequence diagram showing operations of an entire image processing system according to a modification example.

Further, in the present embodiment, in accordance with whether it is possible to acquire color space identification information from the input image file, the printer 600 issues a learning request or an inference request to the edge server 300. However, the device that issues a learning request and the device that issues an inference request may be different. FIG. 14 is a sequence diagram showing the operation of the entire image processing system 100 in a case where learning is performed in response to a learning request from the digital camera 402. In a case where image capturing using the digital camera 402 is performed (S1401), in the digital camera 402, an image file including image data in accordance with a color space set in advance and header information including color space identification information thereon is generated. After that, the digital camera 402 transmits a learning request to the edge server 300 (S1402). The flow of the subsequent processing is the same as the case in FIG. 9 described previously. That is, the edge server 300 having received a learning request transfers the learning request to the cloud server 200 (S1403). Then, the cloud server 200 generates training data from the image file attached to the received learning request (S1404) and performs learning using the training data (S1405). Then, the cloud server 200 updates the learning model 253 based on learning results (S1406) and distributes the learning model 253 after the updating to the edge server 300 as the already-learned model 352 (S1407). The edge server 300 having received the already-learned model 352 from the cloud server 200 reflects the contents thereof in the already-learned model 352 possessed by the edge server 300 itself and stores the already-learned model 352. By designing the configuration such as this, each time image capturing is performed by the digital camera 402, learning is performed and the learning model 253 is updated, and therefore, it is possible to perform inference using the learning results at the time of printing. In this case, it is made possible to collect a larger amount of training data, and therefore, it is possible to perform inference with a higher accuracy. The digital camera 402 is an example and the smartphone may be used, or both may be used. By designing a configuration so as to broadly collect training data from a still larger number of devices 400, it is made possible to perform inference with a higher accuracy.

As above, according to the present embodiment, at the time of performing a print job in a printer, even in a case where it is not possible to obtain color space identification information on printing-target image data, it is made possible to perform appropriate color space conversion processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to appropriately specify a color space for image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-121427, filed Jun. 28, 2019 which is hereby incorporated by reference wherein in its entirety.

What is claimed is:

1. A printing apparatus comprising:
at least one memory that stores a program; and
at least one processor that executes the program to perform:
receiving an image file including image data to be printed;
requesting for, in a case where it is not possible to specify a color space of the image data from the image file, inference of the color space of the image data by using a learning model;
determining the color space of the image data based on inference results corresponding to the request; and
performing printing processing of the image data based on the determined color space, wherein
in the inference, at least one of image information obtained by analyzing the image data included in the image file and image capturing information relating to image capturing processing for obtaining the image data is input to the learning model and information indicating the color space of the image data is output from the learning model as the inference results.

2. The printing apparatus according to claim 1, wherein the at least one processor executes the program to further perform:
requesting for learning to obtain the learning model by taking, in a case where it is possible to specify a color space of the image data from the image file, at least one of image information obtained by analyzing the image data and image capturing information relating to image capturing processing for obtaining the image data as input data and color space information indicating a color space of the image data specified from the image file as supervised data.

3. The printing apparatus according to claim 1, wherein the image information is at least one of distribution information of pixel values in the image data and shape information of an image object.

4. The printing apparatus according to claim 1, wherein the image capturing information is setting information regarding at least one of shutter speed, aperture, presence/absence of strobe flash, and white balance.

5. The printing apparatus according to claim 1, wherein in the requesting, at least one of image information obtained by analyzing the image data included in the image file and image capturing information relating to image capturing processing to obtain the image data is transmitted to a server capable of communicating with the printing apparatus.

6. The printing apparatus according to claim 2, wherein the learning model is optimized by machine learning so that a deviation between a color space predicted from the input data and a color space specified by the color space identification information becomes a minimum.

7. The printing apparatus according to claim 1, wherein the inference is performed by an apparatus different from the printing apparatus.

8. A control method performed in a printing apparatus, the control method comprising:
receiving an image file including printing-target image data;
requesting for, in a case where it is not possible to specify a color space of the image data from the image file, inference of the color space of the image data by using a learning model;
determining the color space of the image data based on inference results corresponding to the request; and
performing printing processing of the image data based on the determined color space, wherein
in the inference, at least one of image information obtained by analyzing the image data included in the image file and image capturing information relating to image capturing processing for obtaining the image data is input to the learning model and information indicating the color space of the image data is output from the learning model as the inference results.

9. The control method according to claim 8, further comprising:
requesting for learning to obtain the learning model by taking, in a case where it is possible to specify a color space of the image data from the image file, at least one of image information obtained by analyzing the image data and image capturing information relating to image capturing processing for obtaining the image data as input data and color space information indicating a color space of the image data specified from the image file as supervised data.

10. The control method according to claim 8, wherein the image information is at least one of a distribution of pixel values in the image data and a shape of an image object.

11. The control method according to claim 8, wherein the image capturing information is at least one of shutter speed, aperture, presence/absence of strobe flash, and setting of white balance.

12. The control method according to claim 8, wherein in the requesting, at least one of image information obtained by analyzing the image data included in the image file and image capturing information relating to image capturing processing to obtain the image data is transmitted to a server capable of communicating with the printing apparatus.

13. The control method according to claim 9, wherein the learning model is optimized by machine learning so that a deviation between a color space predicted from the input data and a color space specified by the color space identification information becomes a minimum.

14. The control method according to claim 8, wherein the inference is performed by an apparatus different from the printing apparatus.

* * * * *